Jan. 3, 1933.  M. J. KOZA  1,892,989
PISTON RING INSERTER
Filed Aug. 3, 1931

Inventor

M. J. Koza.

Patented Jan. 3, 1933

1,892,989

UNITED STATES PATENT OFFICE

MILLARD J. KOZA, OF IOWA CITY, IOWA, ASSIGNOR OF ONE-HALF TO EDWARD J. WATKINS, OF IOWA CITY, IOWA

PISTON RING INSERTER

Application filed August 3, 1931. Serial No. 554,858.

This invention relates to piston ring inserters and has for an object to provide a tool which may be manually compressed around the lower piston ring so that a slight pressure on the top of the piston slides the piston into the cylinder quickly with one push.

A further object of the invention is to provide a piston ring compressor which may be formed of a single blank of material shaped to provide a tapered split ring having parallel lips at the split thereof which may be grasped easily between the fingers to compress the tool upon the lower piston ring, the taper of the tool then compressing each of the rings in sequence as the piston is shoved into the cylinder, so that the operation of inserting pistons in cylinders may be easily and quickly performed with minimum manual effort.

A further object is to provide a piston ring compressing tool which will be inexpensive to manufacture, will be strong and durable and will not easily get out of order.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

Figure 1:
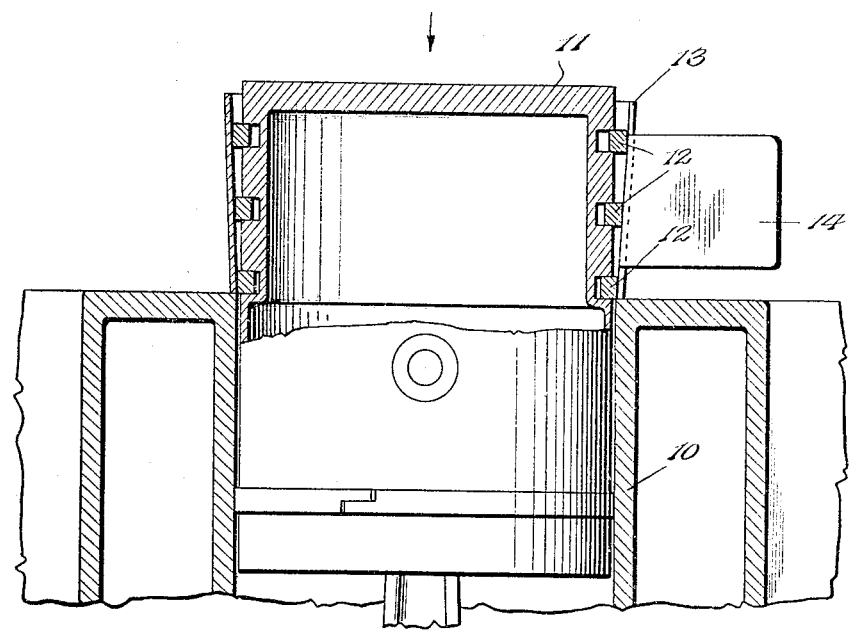
Figure 2:
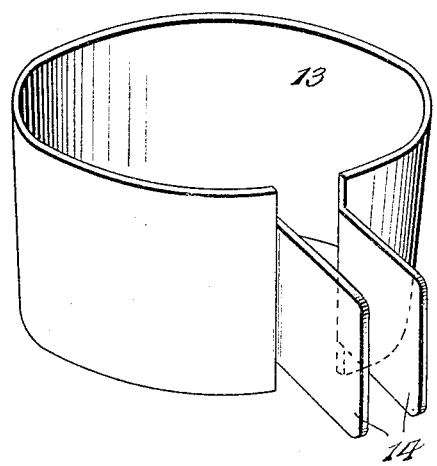

In the accompanying drawing forming part of this specification,

Figure 1 is a vertical sectional view showing the application of the tool to insert a piston in a cylinder, and Fig. 2 is a perspective view of the tool.

Referring now to the drawing in which like characters of reference designate similar parts in the various views, 10 designates a cylinder, and 11 a piston equipped with a plurality of piston rings 12, these parts being of the usual and well-known type.

In carrying out the invention, I provide a resilient split band or ring 13 which is provided at the split thereof with integral parallel lips 14, as best shown in Fig. 2. The tool is preferably formed from a single blank of resilient material, and the ring 13 is tapered uniformly from the upper end thereof to the lower end thereof so that the diameter of the tool is largest at the top and smallest at the bottom, as best shown in Fig. 1. The resiliency of the ring 13 permits of the tool being applied to various sizes of pistons, while at the same time, the tension of the spring material is such as to overcome the resiliency of the piston rings and compress the latter to a diameter sufficient to easily slip into the cylinder.

In practice, the split ring 13 is inserted over the piston rings of the piston so as to engage the lowermost piston ring. Thereupon, the lips 14 are compressed between two fingers of the operator's hand to contract the split ring 13 and compress the lowermost piston ring. Then, a slight pressure on top of the piston slides the piston downward into the cylinder, the split ring 13 engaging all of the piston rings in sequence and contracting them in sequence to enter the cylinder. Thus, a slight downward pressure on the top of the piston in the direction of the arrow-head, shown in Fig. 1, slides the piston with one push easily and quickly into the cylinder.

Preferably, the tool is formed of spring steel, and preferable dimensions are one and three-fourths high and one-sixteenth inch thick, although various other proportions may be used as desired in the construction of the ring, it being only essential that the split ring 13 be provided with lips to compress the ring, and that the ring be resilient and tapered longitudinally to engage and compress the piston rings successively as the piston is pushed into the cylinder.

Having thus described the invention, I claim:

A piston ring inserter comprising a vertically split ring formed of light, thin, sheet steel and tapered uniformly from the top where it is of greatest diameter to the bottom where it is of smallest diameter, exterior fingers projecting from the ends of the split outwardly parallel with each other and formed in one piece with the ring, said fingers being adapted to be gripped by the operator's hand to compress the ring progressively upon piston rings and permit the pistons being shoved downwardly into the engine cylinder with a single push with the operator's free hand on the top thereof, said ring being so light, thin and flexible that by the force of a single hand pressure it can be made to adapt itself to pistons and piston rings of different sizes.

In testimony whereof I affix my signature,

MILLARD J. KOZA. [L. S.]